US012711938B2

(12) United States Patent
Nielsen et al.

(10) Patent No.: US 12,711,938 B2
(45) Date of Patent: Aug. 18, 2026

(54) REDUCING OCCLUSION EFFECT IN WEARABLE AUDIO DEVICES

(71) Applicant: Bose Corporation, Framingham, MA (US)

(72) Inventors: Ole Mattis Nielsen, Cambridge (GB); David-Michael Lozupone, Westborough, MA (US); Aabhas Sharma, Watertown, MA (US)

(73) Assignee: Bose Corporation, Framingham, MA (US)

( * ) Notice: Subject to any disclaimer, the term of this patent is extended or adjusted under 35 U.S.C. 154(b) by 267 days.

(21) Appl. No.: 18/435,156

(22) Filed: Feb. 7, 2024

(65) Prior Publication Data

US 2025/0252944 A1 Aug. 7, 2025

(51) Int. Cl.
*G10K 11/178* (2006.01)

(52) U.S. Cl.
CPC .. *G10K 11/17823* (2018.01); *G10K 11/17825* (2018.01); *G10K 11/17881* (2018.01); *G10K 2210/1081* (2013.01); *G10K 2210/129* (2013.01); *G10K 2210/3026* (2013.01); *G10K 2210/3027* (2013.01); *G10K 2210/501* (2013.01)

(58) Field of Classification Search
CPC ....... G10K 11/17823; G10K 11/17825; G10K 11/17881; G10K 2210/1081; G10K 2210/129; G10K 2210/3026; G10K 2210/3027; G10K 2210/501
USPC ........................................................ 381/71.6
See application file for complete search history.

(56) References Cited

U.S. PATENT DOCUMENTS

| | | | | |
|---|---|---|---|---|
| 2020/0020313 | A1* | 1/2020 | Hua | H04R 1/1016 |
| 2022/0060812 | A1 | 2/2022 | Ganeshkumar | |
| 2022/0417646 | A1* | 12/2022 | Munro | H04R 1/1083 |

OTHER PUBLICATIONS

International Search Report and the Written Opinion of the International Searching Authority, PCT Application No. PCT/US2025/010654, dated Apr. 30, 2025, pp. 1-12.

(Continued)

*Primary Examiner* — Vivian C Chin
*Assistant Examiner* — Douglas J Suthers
(74) *Attorney, Agent, or Firm* — Bond, Schoeneck & King, PLLC

(57) ABSTRACT

A noise reduction system including a feedforward sensor, an audio controller, and an acoustic driver is provided. The feedforward sensor is arranged to detect body conducted vibrations. The feedforward sensor is configured to generate a feedforward signal based on the detected vibrations. The audio controller is communicatively coupled to the feedforward sensor. The audio controller is configured to generate an audio output signal based on the feedforward signal and a command signal. The acoustic driver is configured to render audio based on the audio output signal. In some examples, the noise reduction system further includes a feedback sensor arranged to capture sound within an ear canal of a user. The feedback sensor is configured to generate a feedback signal based on the captured sound. The audio output signal is generated further based on the feedback signal.

20 Claims, 11 Drawing Sheets

(56) References Cited

OTHER PUBLICATIONS

Weyer, Christoph, et al., "Empirical Analysis of Waterbed-like Performance Trade-Off for a Feedforward Occlusion Effect Reduction System," in Proceedings of European Signal Processing Conference (EUSIPCO), Sep. 2023, pp. 1-5, ISBN: 978-9-46459-360-0, RWTH Aachen University, Germany.

Weyer, Christoph, et al., "Occlusion Effect Reduction Using a Vibration Sensor," in Proceedings of International Workshop on Acoustic Signal Enhancement (IWAENC), Sep. 2022, pp. 1-5, ISBN: 978-1-66546-867-1, RWTH Aachen University, Germany.

* cited by examiner

REDUCING OCCLUSION EFFECT IN WEARABLE AUDIO DEVICES

FIELD OF THE DISCLOSURE

The present disclosure is generally directed to systems and methods for reducing occlusion effect in wearable audio devices.

BACKGROUND

Wearable audio devices, such as earbuds, may occlude an ear canal of a user during operation. This occlusion of the ear canal leads to an audible "occlusion effect" where the user perceives their own voice as significantly louder than when their ear canal is unoccluded. The occlusion effect occurs due to vibrations of vocal cords of the user travelling to the ear canal via conduction through bone, flesh, and other types of tissue. Occluding the ear canal increases the sound pressure associated with these vibrations, particularly at low frequencies, causing the user to perceive their voice as sounding loud and unnatural.

SUMMARY

The present disclosure is generally directed to systems and methods for reducing the occlusion effect in wearable audio devices. Broadly, the systems include a feedforward sensor, an audio controller, and an acoustic driver. The feedforward sensor is arranged to detect body conducted vibrations, such as vibrations of a wall of an ear canal of a user. These vibrations may correspond to sound pressure within the ear canal enhanced by occlusion effect. The feedforward sensor generates a feedforward signal based on the detected vibrations. The audio controller includes a feedforward controller to generate a feedforward cancellation signal based on the feedforward signal. The audio controller then combines the feedforward cancellation signal with a command signal to generate an audio output signal. The command signal may include audio data (such as music, spoken word, etc.) for playback to the user. The acoustic driver then generates audio based on the audio output signal. Accordingly, the generated audio both (1) provides the audio data to the user and (2) reduces the occlusion effect by cancelling at least a portion of the sound pressure generated by the vibration of the wall of the ear canal.

In some examples, the systems also include a feedback sensor and/or an external feedforward sensor. The feedback sensor may be arranged to capture sound within the ear canal of the user, including the audio generated by the acoustic driver as well as audio corresponding to the vibrations of the walls of the ear canal due to the occlusion effect. The feedback sensor generates a feedback signal based on the captured sound within the ear canal. The audio controller may use a feedback controller to generate a feedback cancellation signal. The external feedforward sensor is positioned to capture external sound, including voice audio spoken by the user. The external feedforward sensor generates an external feedforward signal based on the captured external sound. The audio controller may use an external feedforward controller to generate an external feedforward cancellation signal. The audio controller may then use the feedback cancellation signal and the external feedforward cancellation signal to remove feedback sound and/or external sound from the audio output signal. The feedforward controller, the feedback controller, and the external feedforward controller may include adaptive filters.

In some examples, the wearable audio device is an earbud with a housing, a nozzle, and an ear tip. The acoustic driver may be arranged within the housing. The housing may be acoustically coupled to the nozzle to direct audio rendered by the acoustic driver to the ear canal of the user. The feedback sensor, such as a microphone, may be arranged within the nozzle to capture audio within the ear canal, including the audio generated by the acoustic driver. The feedforward sensor may be arranged or embedded within an exterior surface of the nozzle to detect the vibrations of a wall of the ear canal. The external feedforward sensor, such as a microphone, is arranged entirely outside of the ear of the user. The ear tip is coupled to the nozzle and occludes the ear canal of the user when inserted into the ear canal.

The feedforward sensor is positioned to detect vibrations of a wall of the ear canal without detecting vibrations associated with the acoustic driver. In some examples, the feedforward sensor includes a measurement axis. The feedforward sensor is arranged such that the measurement axis is perpendicular to vibrations generated by the acoustic driver. The feedforward sensor may be a voice-band accelerometer or any other type of vibration sensor.

Generally, in one aspect, a noise reduction system is provided. The noise reduction system includes a feedforward sensor. The feedforward sensor is arranged to detect body conducted vibrations. The feedforward sensor is configured to generate a feedforward signal based on the detected vibrations.

The noise reduction system further includes an audio controller. The audio controller is communicatively coupled to the feedforward sensor. The audio controller is configured to generate an audio output signal based on the feedforward signal and a command signal.

The noise reduction system further includes an acoustic driver. The acoustic driver is configured to render audio based on the audio output signal.

The feedforward sensor is arranged within a nozzle of a wearable audio device. The feedforward sensor is oriented to avoid sensing vibrations from the acoustic driver.

According to an example, the body conducted vibrations correspond to vibrations of a wall of an ear canal.

According to an example, the body conducted vibrations are captured outside of an ear canal, and wherein the body conducted vibrations are indicative of vibrations of a wall of the ear canal.

According to an example, the noise reduction system further includes a feedback sensor. The feedback sensor is arranged to capture sound within an ear canal of a user. The feedback sensor is configured to generate a feedback signal based on the captured sound. The audio output signal is generated further based on the feedback signal.

According to an example, the audio controller is further configured to generate, via a feedback controller, a feedback cancellation signal based on the feedback signal and the command signal.

According to an example, the audio controller is further configured to generate, via a feedforward controller, a feedforward cancellation signal based on the feedforward signal.

According to an example, the audio controller is further configured to generate the audio output signal based on the feedback cancellation signal and the feedforward cancellation signal.

According to an example, the feedback sensor is a microphone.

According to an example, the feedforward sensor is a voice-band accelerometer.

According to an example, the feedforward sensor may include a measurement axis. The measurement axis may be perpendicular to vibrations generated by the acoustic driver to render the audio.

According to an example, the command signal includes audio data.

According to an example, the noise reduction system further includes an external feedforward sensor. The external feedforward sensor is arranged to capture external sound. The external feedforward sensor is configured to generate an external feedforward signal based on the external sound. The audio output signal is generated further based on the external feedforward signal.

Generally, in another aspect, a wearable audio device is provided. The wearable audio device includes a feedforward sensor. The feedforward sensor is arranged to detect body conducted vibrations. The feedforward sensor is configured to generate a feedforward signal based on the detected vibrations.

The wearable audio device further includes an audio controller communicatively coupled to the feedforward sensor. The audio controller is configured to generate an audio output signal based on the feedforward signal and a command signal.

The wearable audio device further includes an acoustic driver configured to render audio based on the audio output signal.

The feedforward sensor is arranged within a nozzle of the wearable audio device. The feedforward sensor is oriented to avoid sensing vibrations from the acoustic driver.

According to an example, the wearable audio device further includes a feedback sensor. The feedback sensor is arranged to capture sound within an ear canal of a user. The feedback sensor is configured to generate a feedback signal based on the captured sound. The audio output signal is generated further based on the feedback signal.

According to an example, the audio controller is further configured to (1) generate, via a feedback controller, a feedback cancellation signal based on the feedback signal and the command signal; (2) generate, via a feedforward controller, a feedforward cancellation signal based on the feedforward signal; and (3) generate the audio output signal based on the feedback cancellation signal and the feedforward cancellation signal.

According to an example, the feedforward sensor is embedded within an exterior surface of the nozzle.

According to an example, the wearable audio device further includes an ear tip. The ear tip is configured to be coupled to the nozzle. The ear tip is configured to be inserted into the ear canal of the user. The ear tip is further configured to occlude the ear canal of the user when inserted into the ear canal.

According to an example, the feedforward sensor may include a measurement axis. The measurement axis may be perpendicular to vibrations generated by the acoustic driver to render the audio.

Generally, in another aspect, a method for reducing noise is provided. The method includes (1) generating, via a feedforward sensor arranged to detect body conducted vibrations, a feedforward signal based on the detected vibrations; (2) generating, via an audio controller communicatively coupled to the feedforward sensor, an audio output signal based on the feedforward signal and a command signal; and (3) rendering, via an acoustic driver, audio based on the audio output signal. The feedforward sensor is arranged within a nozzle of a wearable audio device. The feedforward sensor is oriented to avoid sensing vibrations from the acoustic driver.

According to an example, the method further includes (1) generating, via a feedback sensor arranged to capture sound within an ear canal of a user, a feedback signal based on the captured sound; (2) generating, via a feedback controller, a feedback cancellation signal based on the feedback signal and the command signal; (3) generating, via a feedforward controller, a feedforward cancellation signal based on the feedforward signal; and (4) generating the audio output signal further based on the feedback cancellation signal and the feedforward cancellation signal.

In various implementations, a processor or controller can be associated with one or more storage media (generically referred to herein as "memory," e.g., volatile and non-volatile computer memory such as ROM, RAM, PROM, EPROM, and EEPROM, floppy disks, compact disks, optical disks, magnetic tape, Flash, OTP-ROM, SSD, HDD, etc.). In some implementations, the storage media can be encoded with one or more programs that, when executed on one or more processors and/or controllers, perform at least some of the functions discussed herein. Various storage media can be fixed within a processor or controller or can be transportable, such that the one or more programs stored thereon can be loaded into a processor or controller so as to implement various aspects as discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also can appear in any disclosure incorporated by reference should be accorded a meaning most consistent with the particular concepts disclosed herein.

Other features and advantages will be apparent from the description and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION

Figure 1:
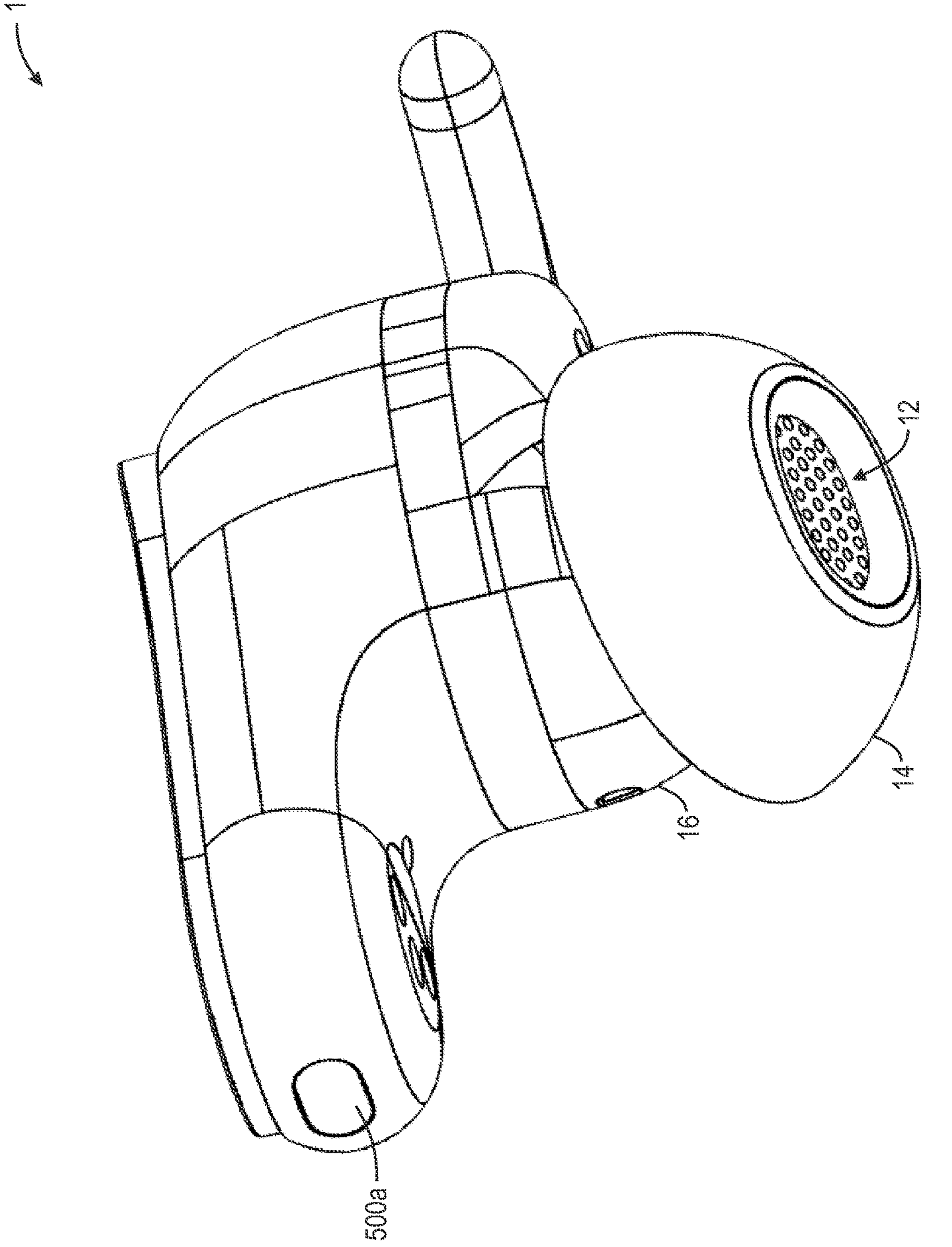
FIG. 1 is an isometric view of a wearable audio device embodied as an earbud, in accordance with an example.

The present disclosure is generally directed to systems and methods for reducing the occlusion effect in wearable audio devices. Broadly, the systems include a feedforward sensor, an audio controller, and an acoustic driver. The feedforward sensor is arranged to detect body conducted vibrations. These vibrations may correspond to sound pressure within an ear canal enhanced by occlusion effect. The feedforward sensor generates a feedforward signal based on the detected vibrations. The audio controller includes a feedforward controller to generate a feedforward cancellation signal based on the feedforward signal. The audio controller then combines the feedforward cancellation signal with a command signal to generate an audio output signal. The command signal may include audio data (such as music, spoken word, etc.) for playback to the user. The acoustic driver then generates audio based on the audio output signal. Accordingly, the generated audio both (1) provides the audio data to the user and (2) reduces the occlusion effect by cancelling at least a portion of the sound pressure generated by the vibration of the wall of the ear canal.

The term "wearable audio device" as used in this disclosure, in addition to including its ordinary meaning or its meaning known to those skilled in the art, is intended to mean a device that fits around, on, in, or near an ear (including open-ear audio devices worn on the head or shoulders of a user) and that radiates acoustic energy into or towards the ear. Wearable audio devices are sometimes referred to as headphones, earphones, earpieces, headsets, earbuds, or sport headphones, and can be wired or wireless. A wearable audio device includes an acoustic driver to transduce audio signals to acoustic energy. The acoustic driver can be housed in an earcup. While some of the figures and descriptions following can show a single wearable audio device, having a pair of earcups (each including an acoustic driver) it should be appreciated that a wearable audio device can be a single stand-alone unit having only one earcup. Each earcup of the wearable audio device can be connected mechanically to another earcup or headphone, for example by a headband and/or by leads that conduct audio signals to an acoustic driver in the ear cup or headphone. A wearable audio device can include components for wirelessly receiving audio signals. A wearable audio device can include components of an active noise reduction (ANR) system. Wearable audio devices can also include other functionality such as a microphone so that they can function as a headset. FIGS. 1-5 shows an examples of an in-the-ear form factor as a wireless earbud.

The following description should be read in view of FIGS. 1-11.

FIGS. 1-5 show various views of a non-limiting example of a wearable audio device 1 embodied as an earbud. Generally, the wearable audio device 1 includes a feedforward sensor 200, an acoustic driver 300, a feedback sensor 400, and one or more external feedforward sensors 500. The aforementioned sensors 200, 400, 500 and acoustic driver 300 are communicatively coupled to an audio controller 100 (see FIG. 6) arranged within the wearable audio device 1. The audio controller 100 processes signals received from the sensors 200, 400, 500 and other inputs to generate audio playback via the acoustic driver 300. In other examples, the wearable audio device 1 may be embodied as a different type of device while still implementing the aforementioned audio controller 100, sensors 200, 300, 500, and acoustic driver 300. For example, the wearable audio device 1 may be embodied as a set of over-ear headphones.

FIG. 1 illustrates a first isometric view of the wearable audio device 1. As shown in FIG. 1, the wearable audio device 1 includes a nozzle 12, an ear tip 14, and a housing 16. As will be demonstrated in subsequent figures, the acoustic driver 300 is arranged within the housing 16. The housing 16 is coupled to the nozzle 12 such that audio generated by the acoustic driver 300 travels from the housing 16 through the nozzle 12 and into an ear canal of a user when worn. The feedback sensor 400 is arranged within the nozzle 12 to capture audio within the ear canal of the user, including audio generated by the acoustic transducer 300 as well as self-voice audio enhanced by the occlusion effect. The feedforward sensor 200 is arranged within an exterior surface 18 of the nozzle 12 to detect vibrations of a wall of the ear canal.

The ear tip 14 is coupled to the nozzle 12 and is inserted into the ear canal of the user during operation. The ear tip 14 is made of a flexible material, such as silicon, to enable the insertion into the ear canal. Accordingly, the ear tip 14 effectively occludes the ear canal of the user when worn, thereby causing the user to experience the occlusion effect. The vibrations of the wall of the ear canal are conveyed through the ear tip 14 to the nozzle 12, thereby enabling the feedforward sensor 200 to detect the vibrations.

Figure 2:
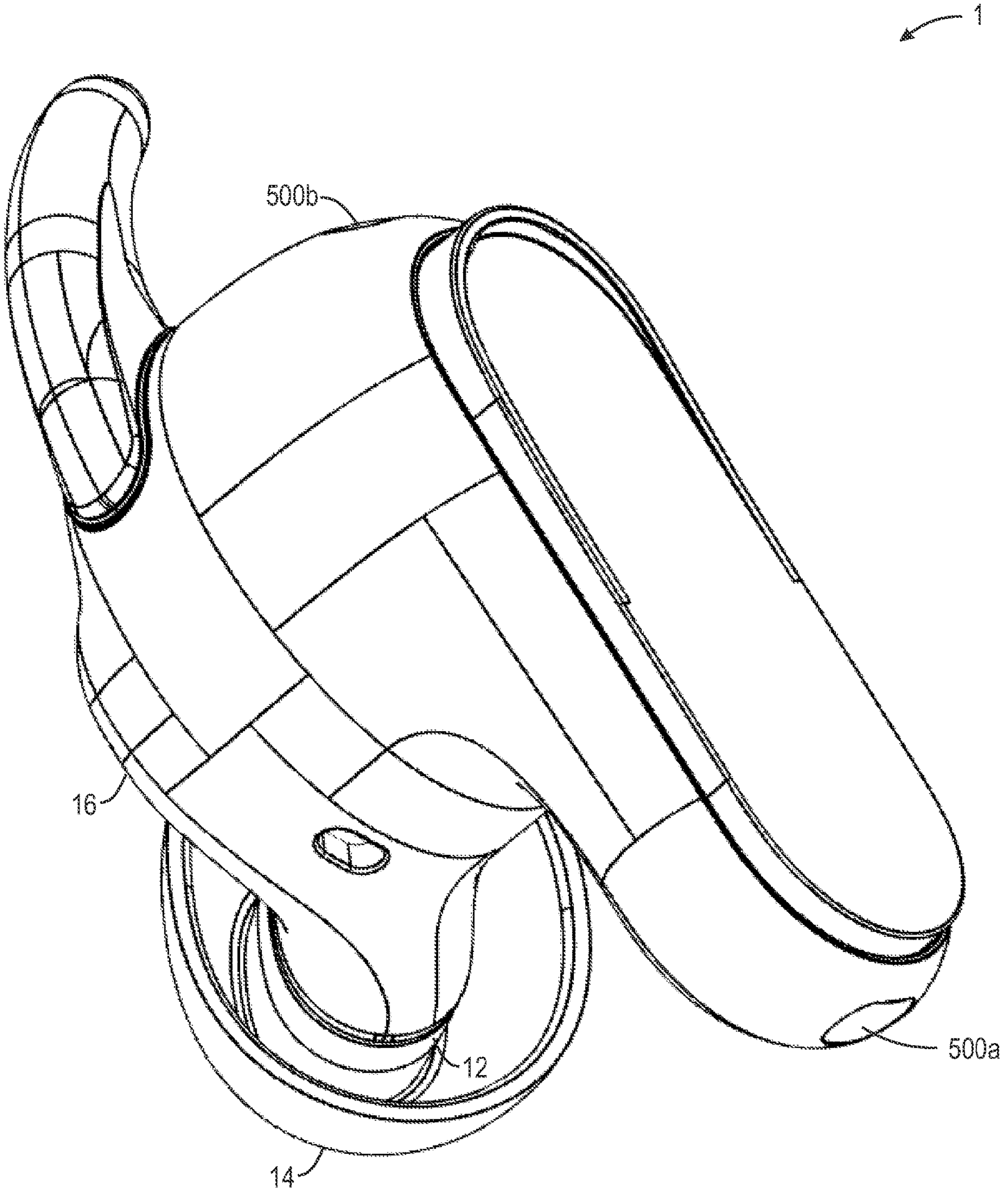
FIG. 2 is a further isometric view of a wearable audio device, in accordance with an example.

FIG. 1 further illustrates a first external feedforward sensor 500*a*. A second external feedforward sensor 500*b* is shown in FIG. 2. The external feedforward sensors 500*a*, 500*b* are configured to capture sound around the ear of the user. In some examples, the external feedforward sensors 500*a*, 500*b* are embodied as microphones. This sound may correspond to a wide variety of different sources, including the voice of the user. The external feedforward sensors 500*a*, 500*b* may be partially embedded within the wearable audio device 1. The sound captured by the external feedforward sensors 500*a*, 500*b* may be used to reduce or cancel external noise from the audio generated by the acoustic driver 300. In further examples, the sound captured by the external feedforward sensors 500*a*, 500*b* may be used to facilitate an "aware mode" where some aspects of the external sound is provided to the user via the acoustic driver 300 for safety purposes.

While FIGS. 1 and 2 illustrate two external feedback sensors 500*a*, 500*b*, in other examples, only one external feedback sensor 500 may be used. In other examples, the wearable audio device 1 may include three or more external feedback sensors 500.

Figure 3:
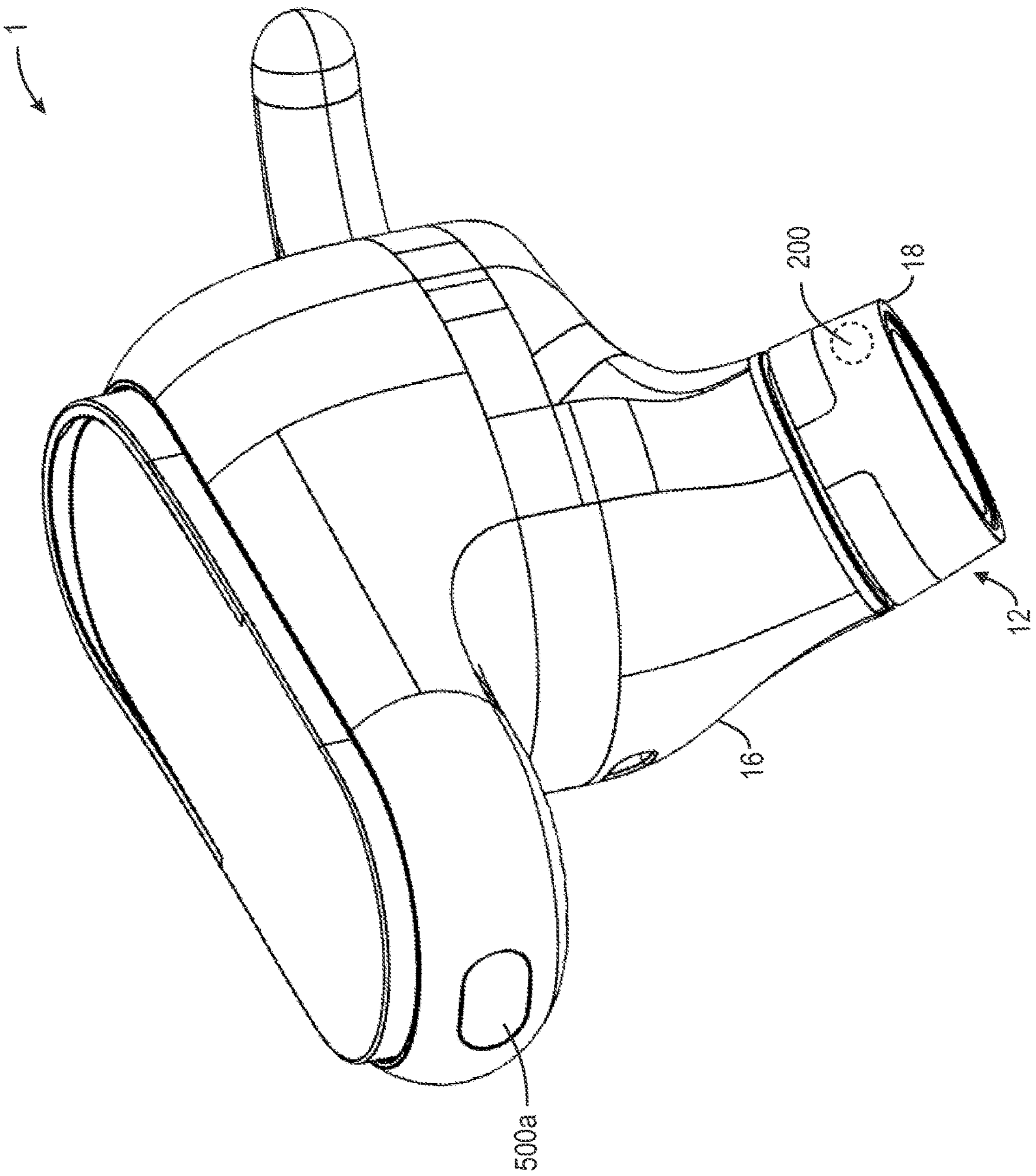
FIG. 3 is an isometric view of the wearable audio device with a hidden ear tip, in accordance with an example.

FIG. 3 illustrates a further isometric view of the wearable audio device 1. In FIG. 3, the previously depicted ear tip 14 is hidden to expose the nozzle 12. FIG. 3 further illustrates feedforward sensor 200 as arranged on or embedded within an exterior surface 18 of the nozzle 12. The feedforward sensor 200 may be an accelerometer capable of capturing vibrations of one or more walls of the ear canal. In particular, the feedforward sensor 200 may be configured as a voice-band accelerometer to capture vibrations at frequencies corresponding to a human voice, such as from 85 to 255 hertz. The feedforward sensor 200 may also be configured to capture vibrations outside of the voice-band, such as less than 85 hertz or greater than 255 hertz. In other examples, the feedforward sensor 200 may be any other vibration sensor capable of capturing the vibrations of the wall of the ear canal due to the occlusion effect. In some examples, the feedforward sensor 200 may be embodied as a system of two or more feedforward sensors 200.

Figure 4:
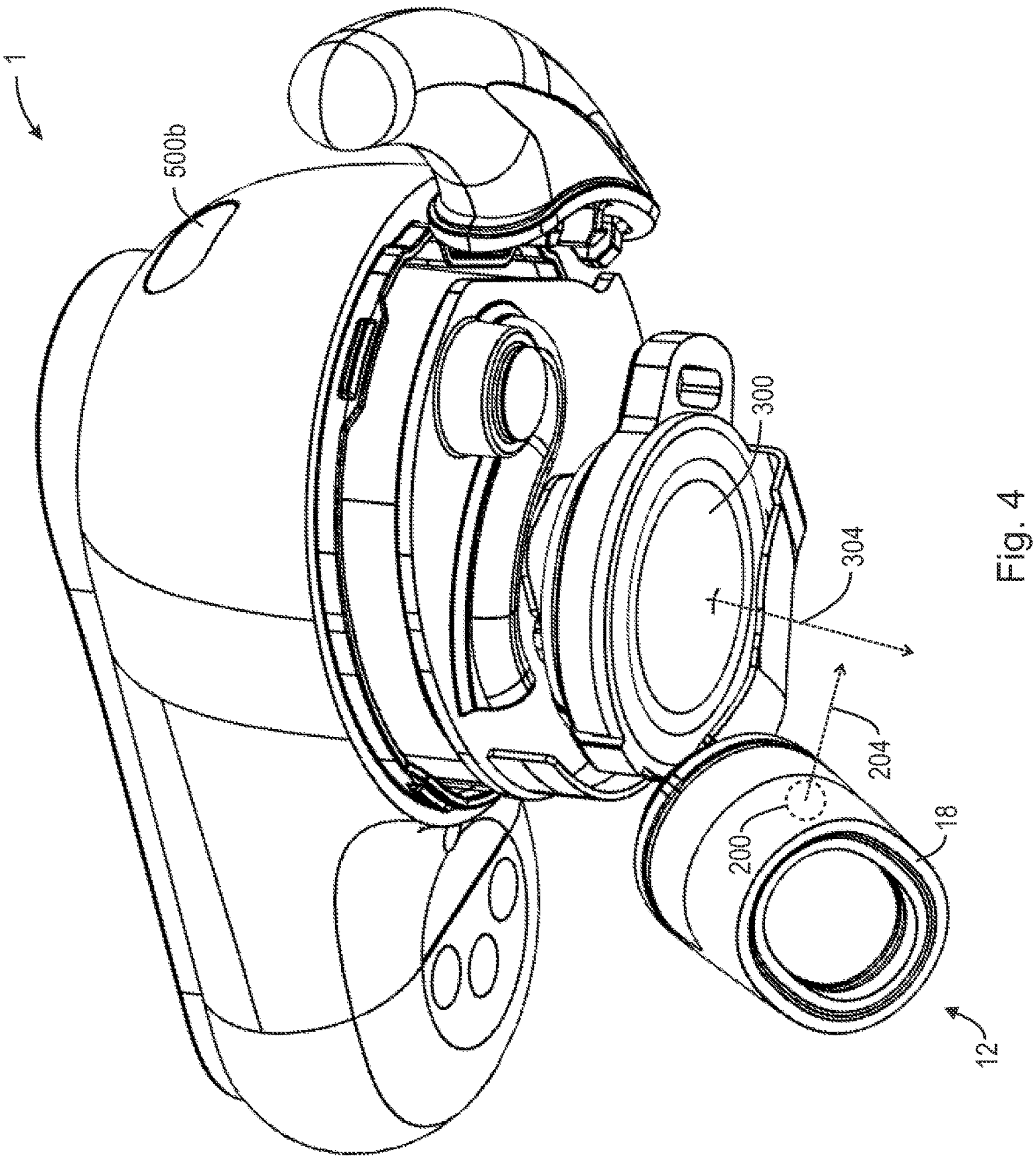
FIG. 4 is an isometric view of the wearable audio device with a hidden ear tip and housing, in accordance with an example.

FIG. 4 illustrates a further isometric view of the wearable audio device 1. In FIG. 4, a portion of the previously depicted housing 16 is hidden to show the acoustic driver 300. When the acoustic driver 300 is actuated to generate sound, a diagram of the acoustic driver 300 vibrates along vibration axis 304. Further, the feedforward sensor 200 is configured with a measurement axis 204. The feedforward sensor 200 is capable of capturing vibrations occurring along the measurement axis 204. The feedforward sensor is located and orientated such that the measurement axis 204 is arranged perpendicular to the vibration axis 300. Accordingly, the feedforward sensor 200 effectively ignores the vibrations of the acoustic driver 300.

In the examples of FIGS. 3 and 4, the feedforward sensor 200 is illustrated as arranged on or within the nozzle 12 to capture body conducted vibrations within the ear canal of the user. Arranging the feedforward sensor 200 on the nozzle 12 is advantageous to minimize time delay in picking up vibrations from ear canal walls. While the ear tip 14 introduces the majority of the time delay, the time delay to transmit vibrations through the rest of the earbud is not negligible. Accordingly, the feedforward sensor 200 should be arranged as close to the source of the vibrations (the ear canal walls) as possible. Ideally, the feedforward sensor 200 would be arranged on the flexible ear tip 12 to eliminate the time delay of vibrations travelling through the rest of the earbud. However, arranging the feedforward sensor 200 directly on the flexible ear tip 12 is typically not practical from a product design perspective. Accordingly, as shown in the embodiment of FIG. 4, the feedforward sensor 200 is arranged on the nozzle 12 to be as close to the vibrating ear canal walls as possible. Further, as described above, the feedforward sensor 200 is circumferentially arranged around the nozzle 12 to minimize the sensing of vibrations generated by the acoustic driver 300.

However, in other examples, the feedforward sensor 200 may be positioned outside of the ear canal to capture body conducted vibrations outside of the ear canal. These body conducted vibrations may be analyzed to determine characteristics of associated vibrations within the ear canal of the user which generate the occlusion effect. This arrangement may be implemented in a wearable audio device which is not configured to be inserted into the ear of the user, as a set of over-ear headphones. In the example of over-ear headphones, the feedforward sensor 200 may be arranged in or on an earcup.

Figure 5:
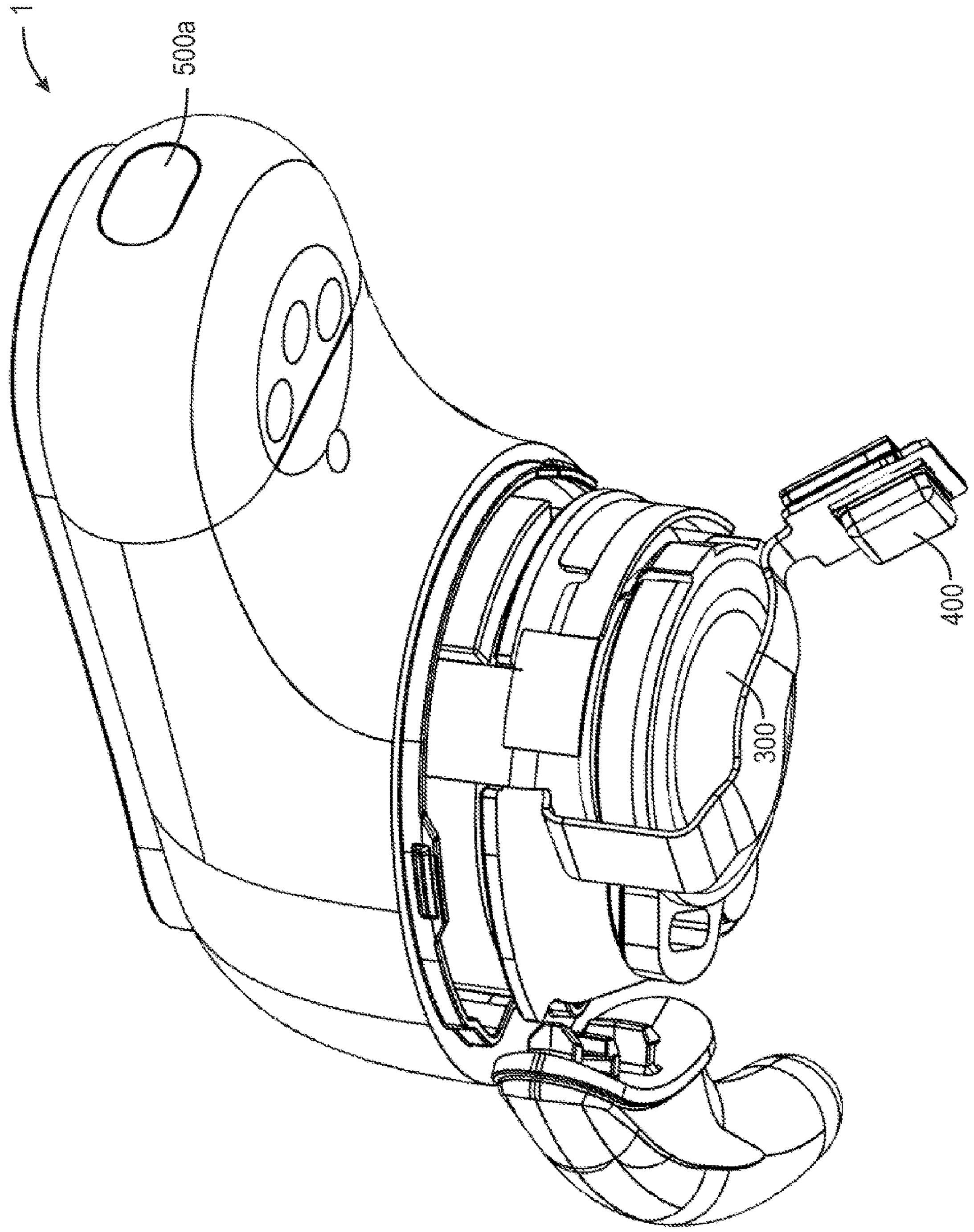
FIG. 5 is an isometric view of the wearable audio device with a hidden ear tip, housing, and nozzle, in accordance with an example.

FIG. 5 illustrates a further isometric view of the wearable audio device 1. In FIG. 5, the previously depicted nozzle 12 is hidden to show the feedback sensor 400. The feedback sensor 400 is arranged within the nozzle 12 to capture sound within the ear canal of the user, including audio generated by the acoustic driver 300, as well as self-voice audio enhanced by the occlusion effect. The feedback sensor 400 may be a microphone. In some embodiments, the feedback sensor 400 may comprise a system of two or more sensors.

Figure 6:
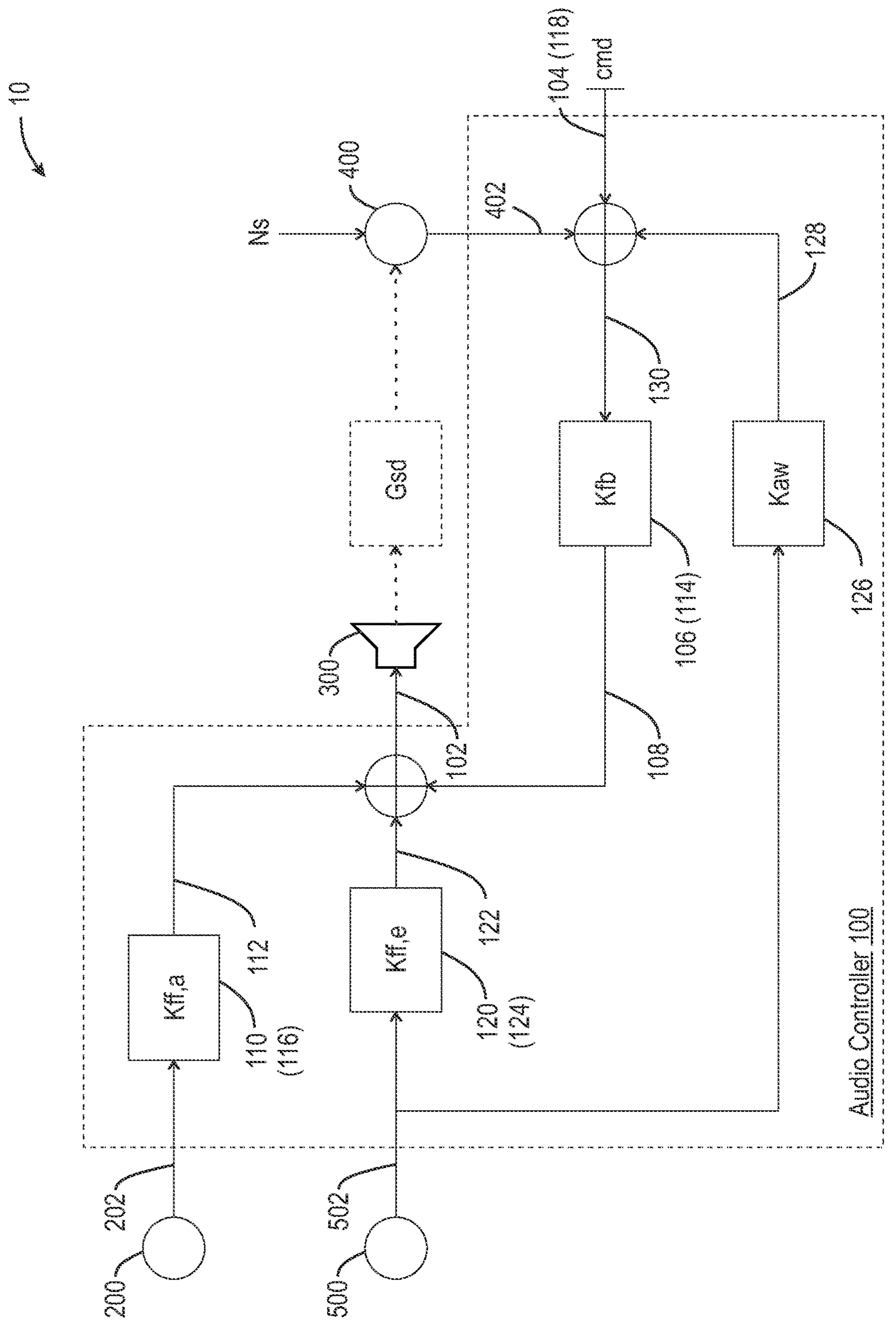
FIG. 6 is a schematic of a noise reduction system, in accordance with an example.

FIG. 6 is a schematic diagram of the noise reduction system 10. The various aspects of the noise reduction system 10 may be components of the wearable audio device 1 shown in FIGS. 1-5. Generally, the noise reduction system 10 includes an audio controller 100, a feedforward sensor 200, an acoustic driver 300, a feedback sensor 400, and an external feedforward sensor 500. The feedforward sensor 200, which may be embodied as one or more voice-band accelerometers, is configured to generate a feedforward signal 202 based on detected bone conducted vibrations. These bone conducted vibrations correspond to vibrations of a wall of an ear canal of a user. These vibrations are enhanced by increased sound pressure due to the occlusion effect. An example feedforward sensor 200 is shown in FIGS. 3 and 4. A feedforward controller 110 of the audio controller 100 receives the feedforward signal 202 and uses a feedforward adaptive filter 110 to generate a feedforward cancellation signal 112. The feedforward cancellation signal 112 is configured to reduce audio corresponding to the occlusion effect within the ear canal of the user during audio playback.

The external feedforward sensor 500, which may be embodied as one or more microphones, is configured to generate an external feedforward signal 502 based on detected external sound proximate to the wearable audio device 1. The external sound may include voice audio of the user, voice audio of an individual near the user, ambient environmental sounds, etc. An example first external feedforward sensor 500*a* is shown in FIGS. 1-3 and 5, while an example second external feedforward sensor 500*b* is shown in FIGS. 2 and 4. An external feedforward controller 120 of the audio controller 100 receives the external feedforward signal 502 and uses an adaptive external feedforward adaptive filter 124 to generate an external feedforward cancellation signal 122. The external feedforward cancellation signal 122 is configured to reduce audio corresponding to the external sound within the ear canal of the user during audio playback.

The feedback sensor 400, which may be embodied as one or more microphones, is configured to capture audio within the ear canal of the user. This audio is represented in FIG. 6 by transfer function $G_{sd}$ and noise signal $n_s$. $G_{sd}$ represents the transfer function between audio generated by the acoustic transducer 300 and the feedback sensor 400, while $n_s$ represents noise within the ear canal and captured by the feedback sensor 400. An example feedback sensor 400 is shown in FIG. 5. The feedback sensor 400 generates a feedback signal 402 corresponding to the transfer function $G_{sd}$ and the noise signal $n_s$.

The audio controller 100 also receives a command signal 104. The command signal 104 may be received from additional circuitry of the wearable audio device 1. The command signal 104 includes audio data 118 for playback by the wearable audio device 1. For example, the audio data 118 could correspond to music, spoken word, sound effects, audio tones, and other forms of audio data.

Further, in some examples, the user may wish to incorporate external audio into the audio playback of the wearable audio device 1. The external audio may be incorporated for a wide variety of reasons, such as for safety purposes. Incorporating the external audio into the audio playback may be referred to as "aware mode" or "transparency mode" selectable by the user through one or more user inputs. As shown in FIG. 6, the external feedforward signal 502 is provided to an aware mode controller 126. The aware mode controller 126 generates an aware mode signal 128 corresponding to the external feedforward signal 502 and the aware mode settings as programmed by the user inputs. For example, if the user disables aware mode, the aware mode controller 126 may reduce the aware mode signal 128 to zero. Alternatively, if the user wishes for more ambient, external audio to be provided, the aware mode controller 126 may increase the amplitude of the aware mode signal 128.

The audio controller 100 combines the feedback signal 402, the command signal 104, and the aware mode signal 128 into a combined feedback signal 130. In some examples, the audio controller 100 may weigh one or more of the aforementioned signals 104, 128, 402 more heavily than the others. In other examples, each of the aforementioned signals 104, 128, 402 may be weighted equally. The combined feedback signal 130 is provided to a feedback controller 106. The feedback controller 106 uses a feedback adaptive filter 114 to generate a feedback cancellation signal 108. The feedback cancellation signal 106 is configured to reduce noise within the ear canal of the user, while also providing playback audio corresponding to the audio data 118 of the command signal 104, and if desired, the aware mode signal 128. The noise may correspond to a variety of sources, including the self-voice of the user enhanced by the occlusion effect.

The audio controller 100 then combines the feedback cancellation signal 108 with the feedforward cancellation signal 112 and the external feedforward cancellation signal 122 to generate an audio output signal 102. The audio output signal 102 is provided to the acoustic driver 300 for audio playback. Accordingly, the user will hear the audio data 118 of the command signal 104 (and, if desired, the aware mode signal 128) while the occlusion effect is reduced due to the cancellation aspects of both the feedforward cancellation signal 112 and the feedback cancellation signal 108.

Figure 7:
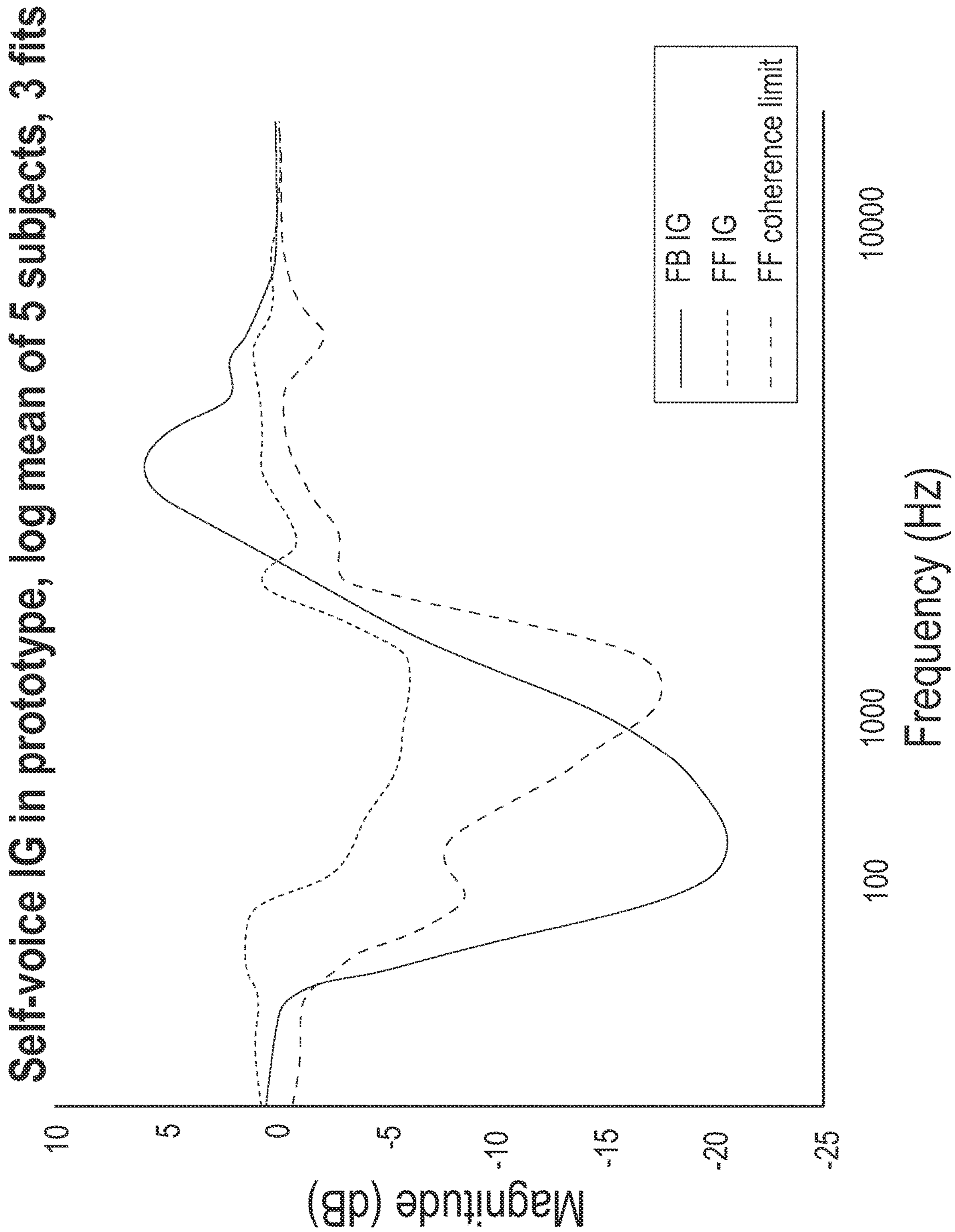
FIG. 7 is a plot of insertion gain for feedback and feedforward noise cancellation configurations, in accordance with an example.

FIG. 7 is a plot illustrating measured insertion gain of feedback and feedforward noise cancellation configurations. In the plots of the FIG. 7, negative insertion gain results in cancellation of the self-voice of the user in their ear canal due to the occlusion effect. In this example, plot "FB IG" of FIG. 7 shows the measured insertion gain due to the application of a feedback loop, such as a feedback loop incorporating the feedback sensor 400 and the feedback controller 106 shown in FIG. 6. For example, the insertion gain due to the feedback loops is approximately −20 dB at 100 hertz, approximately −17 dB at 200 hertz, and approximately 0 dB at 1000 hertz. Thus the feedback loop will reduce the occlusion effect by approximately 17 dB at 200 hertz. Further, plot "FF IG" of FIG. 7 shows the measured insertion gain due to the application of a feedforward input, such as the feedforward sensor 200 and the feedforward controller 110 as shown in FIG. 7. For example, the feedforward input reduces the occlusion effect between approximately 100 hertz and 800 hertz. More specifically, the feedforward input reduces the occlusion effect by approximately 5 dB at 200 hertz. Accordingly, the combination of the feedback loop and the feedforward input will cumulatively reduce the occlusion effect at 200 hertz by approximately 22 dB.

The measured insertion gains due to the feedback loop and the feedforward input were measured on a prototype implementing the noise cancellation system 10 of FIG. 6. The insertion gains shown in FIG. 7 are logarithmic means of insertion gains measured in five subjects, each subject wearing the prototype three times. The feedforward (FF) coherence limit plot represents the maximum theoretical reduction of the occlusion effect provided by the feedforward input. The actual, measured feedforward reduction may be limited by timing delays for the feedforward sensor 400 to capture the ear canal vibrations and provide the corresponding feedforward signal 402 to the audio controller 100 for processing. These time delays may be related to the material properties of the nozzle 12 and the ear tip 14 illustrated in FIGS. 1 and 2.

Figure 8:
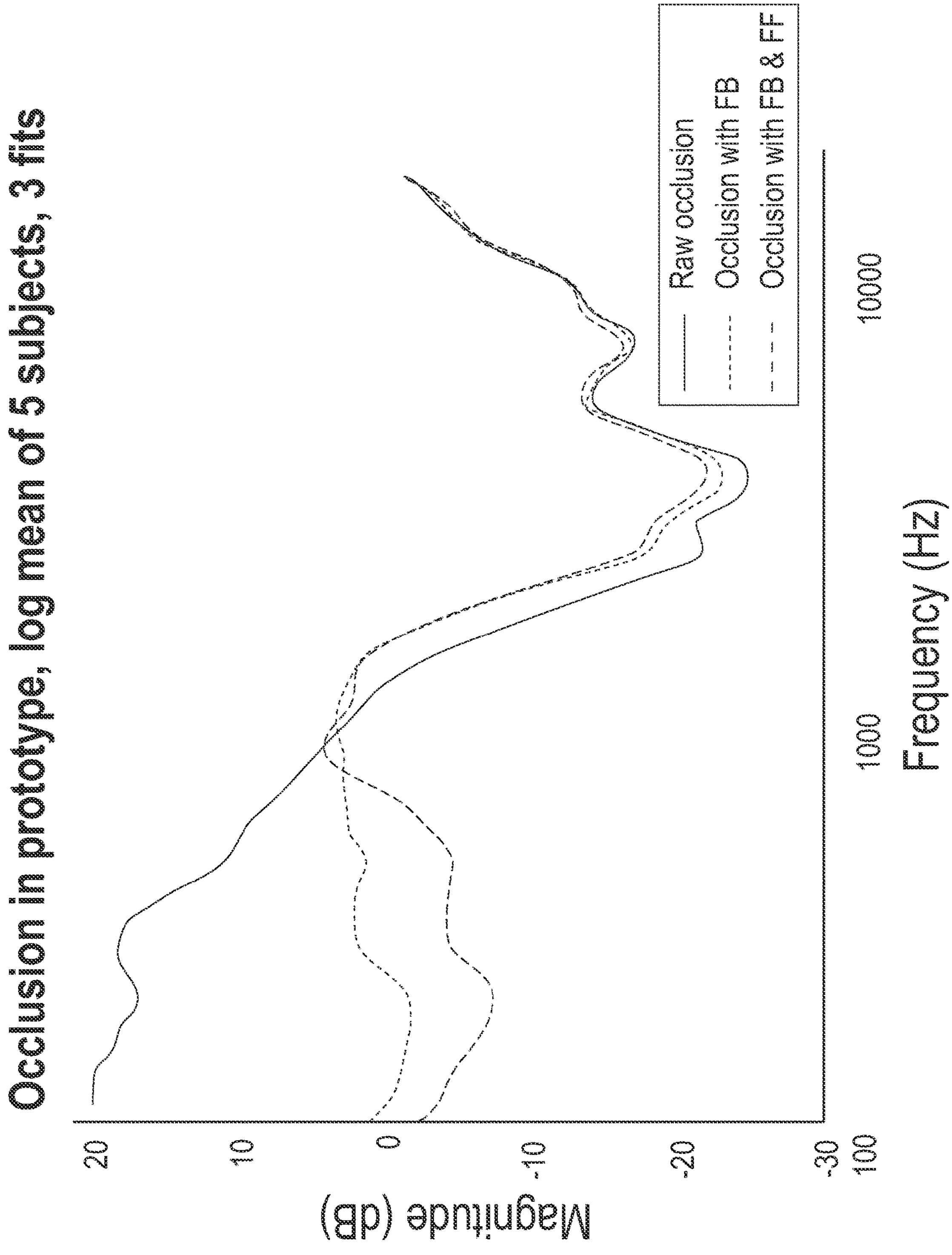
FIG. 8 is a plot of the occlusion effect as reduced by feedback and feedforward noise cancellation configurations, in accordance with an example.

FIG. 8 is a plot of the occlusion effect as reduced by the feedback and feedforward noise cancellation configurations. The "raw occlusion" plot represents the amplification of the self-voice of the user due to the occlusion effect. As can be seen in FIG. 8, the occlusion effect significantly amplifies the self-voice of the user below 1000 hertz. The "occlusion with FB" plot of FIG. 8 illustrates the reduction of the occlusion effect due to the implementation of a feedback loop, such as the feedback sensor 400 and the feedback controller 106 of FIG. 6. Accordingly, the occlusion with FB plot may be considered to be the result of subtracting the FB IG plot of FIG. 7 from the raw occlusion plot of FIG. 8. The "occlusion with FB and FF" plot of FIG. 8 illustrates the reduction of the occlusion effect due to the implementation of both the feedback loop and the feedforward input, such as the feedforward sensor 200 and the feedforward controller 110 of FIG. 6. Accordingly, the occlusion with FB and FF plot may be considered to be the result of subtracting the FB IG and FF IG plots of FIG. 7 from the raw occlusion plot of FIG. 8. Critically, FIG. 8 illustrates the improvement in occlusion effect reduction below 1000 hertz due to incorporating the feedforward sensor 400 and the feedback control 110 into the noise reduction system 10 of FIG. 6.

Figure 9:
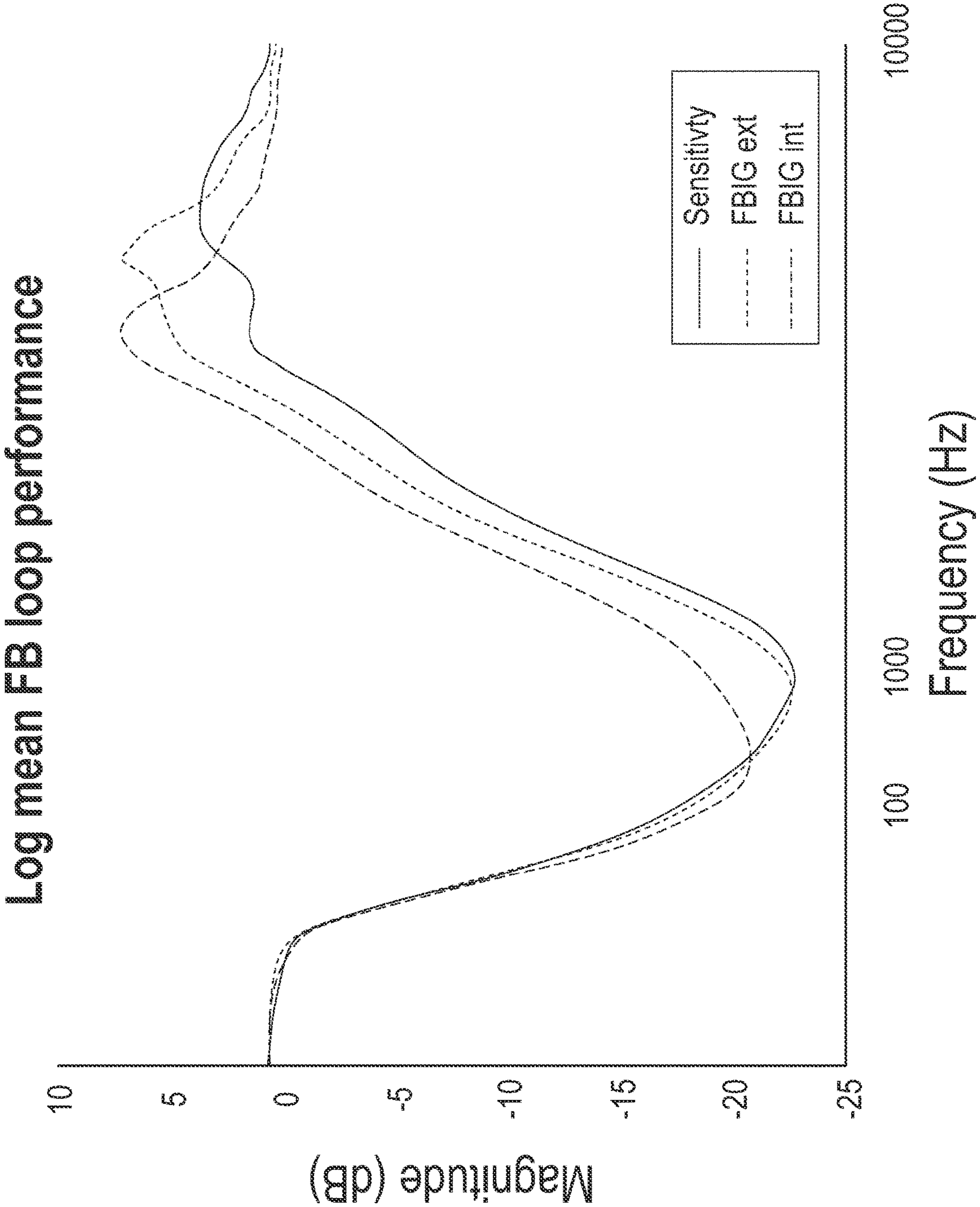
FIG. 9 is a plot of feedback loop performance, in accordance with an example.

FIG. 9 is a plot of feedback loop performance. The "FBIG int" plot of FIG. 9 corresponds to the FB IG plot of FIG. 7, and represents the occlusion effect reduction due to a feedback loop, such as the feedback sensor 400 and the feedback controller 106 of FIG. 6. The "FBIG ext" plot of FIG. 9 represents the reduction of external sound due to the feedback loop. The external sound could correspond to a wide array of sources excluding bone conducted voice audio enhanced by the occlusion effect. The sensitivity plot of FIG. 9 represents the sensitivity of the feedback sensor 400 (embodied as a microphone) over the illustrated frequency range.

Figure 10:
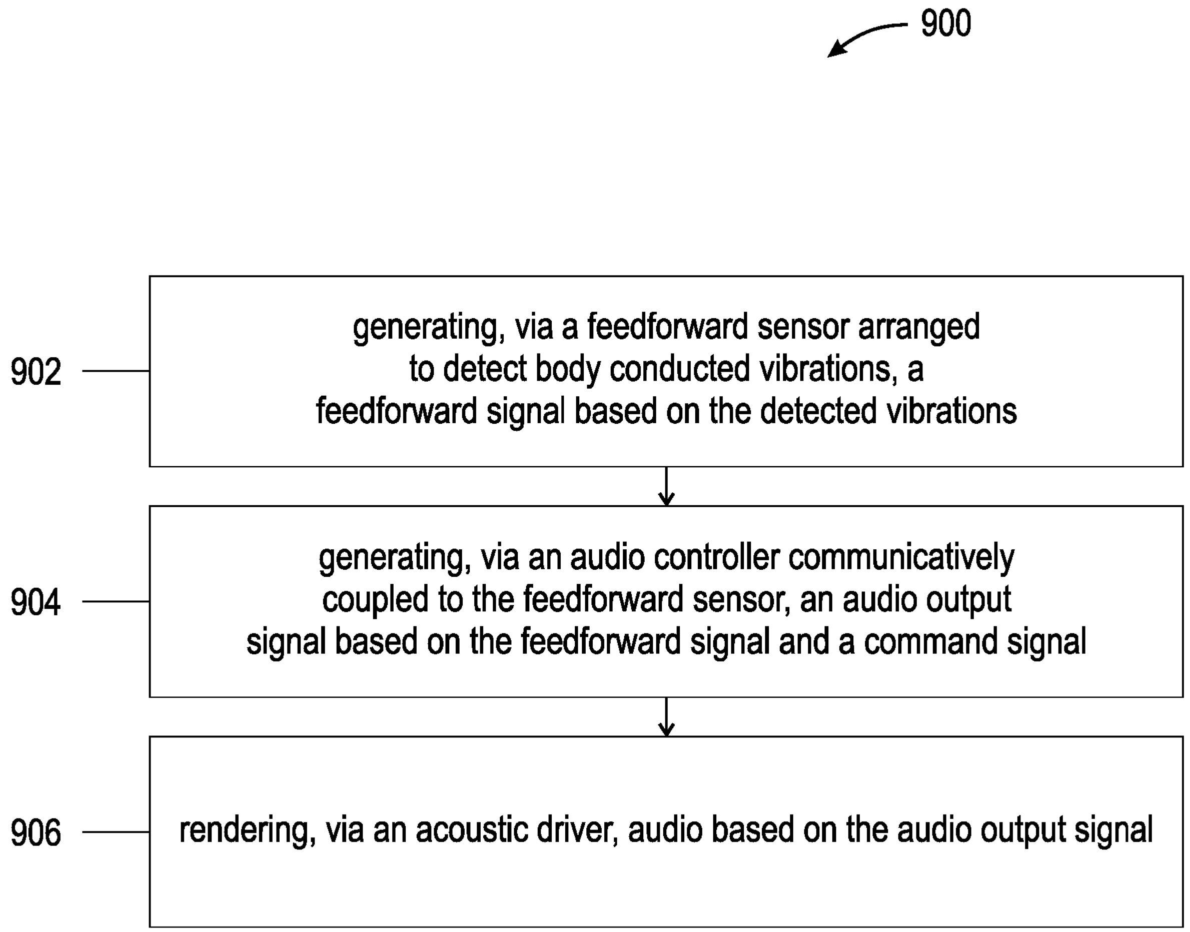
FIG. 10 is a flow chart of a method for noise reduction, in accordance with an example.

FIG. 10 is a flow chart of a method 900 for reducing noise, according to various embodiments of the invention. Referring to FIGS. 1-11, the method 900 includes, in step 902, generating, via a feedforward sensor 200 arranged to detect body conducted vibrations, a feedforward signal 202 based on the detected vibrations.

The method 900 further includes, in step 904, generating, via an audio controller 100 communicatively coupled to the feedforward sensor 200, an audio output signal 102 based on the feedforward signal 202 and a command signal 104.

The method 900 further includes, in step 906, rendering, via an acoustic driver 300, audio based on the audio output signal 104.

The feedforward sensor 200 is arranged within a nozzle 12 of a wearable audio device 1. The feedforward sensor 200 is oriented to avoid sensing vibrations from the acoustic driver 300.

Figure 11:
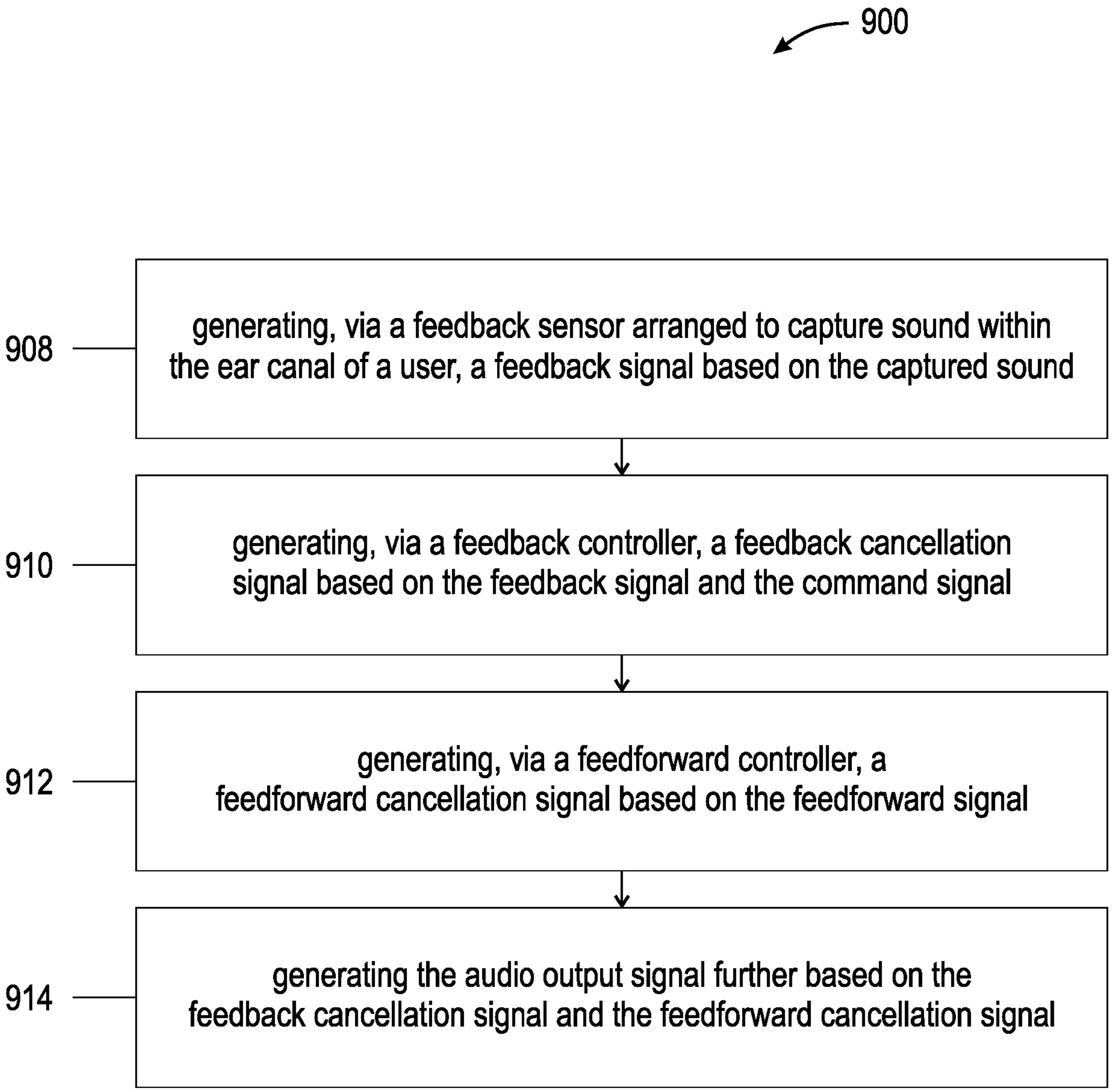
FIG. 11 is a flow chart of further steps of a method for noise reduction, in accordance with an example.

FIG. 11 is a flow chart of additional steps of method 900 for reducing noise. The method 900 further includes generating, in step 908, via a feedback sensor 400 arranged to capture sound within the ear canal of a user, a feedback signal 402 based on the captured sound.

The method 900 further includes generating, in step 910, via a feedback controller 106, a feedback cancellation signal 108 based on the feedback signal 402 and the command signal 104.

The method 900 further includes generating, in step 912, via a feedforward controller 110, a feedforward cancellation signal 112 based on the feedforward signal 202.

The method 900 further includes generating, in step 914, the audio output signal 102 further based on the feedback cancellation signal 108 and the feedforward cancellation signal 112.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects can be implemented using hardware, software or a combination thereof. When any aspect is implemented at least in part in software, the software code can be executed on any suitable processor or collection of processors, whether provided in a single device or computer or distributed among multiple devices/computers.

The present disclosure can be implemented as a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some examples, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions can be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant can be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples can be practiced otherwise than as specifically described and claimed. Examples of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

What is claimed is:

1. A noise reduction system, comprising:

a feedforward sensor arranged to detect body conducted vibrations and configured to generate a feedforward signal based on the detected vibrations;

an audio controller communicatively coupled to the feedforward sensor, wherein the audio controller is configured to generate an audio output signal based on the feedforward signal and a command signal; and an acoustic driver configured to render audio based on the audio output signal, wherein the feedforward sensor is arranged within a nozzle of a wearable audio device, wherein the feedforward sensor comprises a measurement axis perpendicular to vibrations generated by the acoustic driver to render the audio such that the feedforward sensor is oriented to avoid sensing the vibrations from the acoustic driver.

2. The noise reduction system of claim 1, wherein the body conducted vibrations correspond to vibrations of a wall of an ear canal.

3. The noise reduction system of claim 1, wherein the body conducted vibrations are captured outside of an ear canal, and wherein the body conducted vibrations are indicative of vibrations of a wall of the ear canal.

4. The noise reduction system of claim 1, further comprising a feedback sensor arranged to capture sound within an ear canal of a user and configured to generate a feedback signal based on the captured sound, wherein the audio output signal is generated further based on the feedback signal.

5. The noise reduction system of claim 4, wherein the audio controller is further configured to:

generate, via a feedback controller, a feedback cancellation signal based on the feedback signal and the command signal;

generate, via a feedforward controller, a feedforward cancellation signal based on the feedforward signal; and generate the audio output signal based on the feedback cancellation signal and the feedforward cancellation signal.

6. The noise reduction system of claim 4, wherein the feedback sensor is a microphone.

7. The noise reduction system of claim 1, wherein the feedforward sensor is a voice-band accelerometer configured to capture vibrations at frequencies from 85 to 255 Hz.

8. The noise reduction system of claim 1, wherein the command signal comprises audio data.

9. The noise reduction system of claim 1, further comprising an external feedforward sensor arranged to capture external sound.

10. The noise reduction system of claim 9, wherein the external feedforward sensor is configured to generate an external feedforward signal based on the external sound, and wherein the audio output signal is generated further based on the external feedforward signal.

11. A wearable audio device, comprising:

a feedforward sensor arranged to detect body conducted vibrations and configured to generate a feedforward signal based on the detected vibrations;

an audio controller communicatively coupled to the feedforward sensor, wherein the audio controller is configured to generate an audio output signal based on the feedforward signal and a command signal; and an acoustic driver configured to render audio based on the audio output signal, wherein the feedforward sensor is arranged within a nozzle of a wearable audio device, wherein the feedforward sensor comprises a measurement axis perpendicular to vibrations generated by the acoustic driver to render the audio such that the feedforward sensor is oriented to avoid sensing the vibrations from the acoustic driver.

12. The wearable audio device of claim 11, further comprising a feedback sensor arranged to capture sound within an ear canal of a user and configured to generate a feedback signal based on the captured sound, wherein the audio output signal is generated further based on the feedback signal.

13. The wearable audio device of claim 12, wherein the audio controller is further configured to:

generate, via a feedback controller, a feedback cancellation signal based on the feedback signal and the command signal;

generate, via a feedforward controller, a feedforward cancellation signal based on the feedforward signal; and generate the audio output signal based on the feedback cancellation signal and the feedforward cancellation signal.

14. The wearable audio device of claim 12, wherein the feedforward sensor is embedded within an exterior surface of the nozzle.

15. The wearable audio device of claim 14, further comprising an ear tip configured to be coupled to the nozzle and to be inserted into the ear canal of the user.

16. The wearable audio device of claim 15, wherein the ear tip is further configured to occlude the ear canal of the user when inserted into the ear canal.

17. The wearable audio device of claim 11, wherein the feedforward sensor is a voice-band accelerometer configured to capture vibrations at frequencies from 85 to 255 Hz.

18. A method for reducing noise, comprising:

generating, via a feedforward sensor arranged to detect body conducted vibrations, a feedforward signal based on the detected vibrations;

generating, via an audio controller communicatively coupled to the feedforward sensor, an audio output signal based on the feedforward signal and a command signal; and rendering, via an acoustic driver, audio based on the audio output signal, wherein the feedforward sensor is arranged within a nozzle of a wearable audio device, wherein the feedforward sensor comprises a measurement axis perpendicular to vibrations generated by the acoustic driver to render the audio such that the feedforward sensor is oriented to avoid sensing the vibrations from the acoustic driver.

19. The method of claim 18, wherein the feedforward sensor is a voice-band accelerometer configured to capture vibrations at frequencies from 85 to 255 Hz.

20. The method of claim 18, further comprising:

generating, via a feedback sensor arranged to capture sound within an ear canal of a user, a feedback signal based on the captured sound;

generating, via a feedback controller, a feedback cancellation signal based on the feedback signal and the command signal;

generating, via a feedforward controller, a feedforward cancellation signal based on the feedforward signal; and generating the audio output signal further based on the feedback cancellation signal and the feedforward cancellation signal.

* * * * *